United States Patent
Kwon et al.

(10) Patent No.: US 8,121,212 B2
(45) Date of Patent: Feb. 21, 2012

(54) TRANSMITTING APPARATUS AND METHOD, AND RECEIVING APPARATUS AND METHOD IN MULTPLE ANTENNA SYSTEM

(75) Inventors: Dong-Seung Kwon, Daejeon (KR); Young-Seog Song, Daejeon (KR); Seung-Joon Lee, Daejeon (KR); Jong-Ee Oh, Daejeon (KR); Chungyong Lee, Daejeon (KR); Myeong-Cheol Shin, Daejeon (KR)

(73) Assignees: Electronics and Telecommunications Research Institute, Daejeon (KR); Industry-Academic Cooperation Foundation, Yonsei University, Seoul (KR)

(*) Notice: Subject to any disclaimer, the term of this patent is extended or adjusted under 35 U.S.C. 154(b) by 862 days.

(21) Appl. No.: 12/096,778

(22) PCT Filed: Dec. 4, 2006

(86) PCT No.: PCT/KR2006/005171

§ 371 (c)(1),
(2), (4) Date: Jun. 9, 2008

(87) PCT Pub. No.: WO2007/066936

PCT Pub. Date: Jun. 14, 2007

(65) Prior Publication Data

US 2009/0252240 A1    Oct. 8, 2009

(30) Foreign Application Priority Data

Dec. 9, 2005    (KR) ................ 10-2005-0120778

(51) Int. Cl.
*H04B 7/02*    (2006.01)
(52) U.S. Cl. ............... 375/267; 370/310; 375/240.22; 455/13.3; 455/272
(58) Field of Classification Search ............... None
See application file for complete search history.

(56) References Cited

U.S. PATENT DOCUMENTS

| | | | |
|---|---|---|---|
| 5,781,134 | A | 7/1998 | Son |
| 6,311,154 | B1 | 10/2001 | Gersho et al. |
| 2002/0119781 | A1 | 8/2002 | Li et al. |
| 2005/0201307 | A1 | 9/2005 | Chae et al. |

FOREIGN PATENT DOCUMENTS

| | | |
|---|---|---|
| JP | 10-135842 | 3/1998 |
| JP | 2000-013128 | 1/2000 |
| KR | 10-2000-0013339 | 3/2000 |

(Continued)

OTHER PUBLICATIONS

Nadia Khaled, et al., "Optimizing the Joint Transmit and Receive MMSE Design Using Mode Selection", IEEE Transactions on Communications, vol. 53, No. 4, Apr. 2005, pp. 730-737.

(Continued)

*Primary Examiner* — David C. Payne
*Assistant Examiner* — Adolf Dsouza
(74) *Attorney, Agent, or Firm* — Kile Park Goekjian Reed & McManus PLLC (57) ABSTRACT

Respective codewords of quantization codebooks corresponding to a number of data streams are selected based on channel information estimated by a received training symbol. A stream mode is selected among stream modes to determine a modulation method applied to each data stream. The data stream is detected by using the codeword corresponding to the quantization codebook of the data stream corresponding to the selected stream mode as a precode matrix, and the detected data stream is modulated. In this case, a receiving apparatus performs a feedback operation so that indexes of the selected stream mode and the codeword used as the precode matrix may be transmitted to the transmitting apparatus. The transmitting apparatus selects the number of transmitted data streams and the modulation method based on the transmitted index of feedback streams by the feedback operation.

14 Claims, 6 Drawing Sheets

FOREIGN PATENT DOCUMENTS

| | | |
|---|---|---|
| KR | 10-2001-0093240 | 10/2001 |
| KR | 10-2004-0004462 | 1/2004 |
| KR | 10-2005-0055592 | 6/2005 |
| WO | 02/082689 | 10/2002 |

OTHER PUBLICATIONS

David J. Love et al., Limited Feedback Unitary Precoding for Orthogonal Space-Time Block Codes, Jan. 2005, pp. 64-73, vol. 53, No. 1.

David J. Love et al., Limited Feedback Unitary Precoding for Spatial Multiplexing Systems, Aug. 2005, pp. 2967-2976.

Shahab Sanayei et al., On the Design of Linear Precoders for Orthogonal Space-Time Block Codes with Limited Feedback, 2005, pp. 489-493.

Roopsha Samanta et al., Codebook Adaptation for Quantized MIMO Beamforming Systems, 2005, pp. 376-379.

International Search Report—PCT/KR2006/005171 dated Jun. 26, 2008.

Written Opinion—PCT/KR2006/005171 dated Jun. 26, 2008.

TRANSMITTING APPARATUS AND METHOD, AND RECEIVING APPARATUS AND METHOD IN MULTPLE ANTENNA SYSTEM

TECHNICAL FIELD

The present invention relates to a transmitter and a receiver of a multiple antenna system, and transmitting and receiving methods thereof. More specifically, the present invention relates to a transmitter and a receiver for increasing performance of a quantization precoder in a multiple antenna system.

BACKGROUND ART

A multiple antenna system is classified as an open-loop system in which channel information is not informed to a transmitting terminal, and a closed-loop system in which the channel information is informed to the transmitting terminal and the transmitting terminal uses the channel information to precode a symbol and to transmit the precoded symbol.

In the open-loop system, a transmission symbol is space-time encoded such that the symbol may obtain a high diversity gain and an encoding gain. However, such a space-time encoding method has been developed to be optimized in a statistical channel, and therefore instantaneous channel variations may not be appropriately applied.

The closed-loop system obtains instantaneous channel information from the transmitting terminal, and uses the instantaneous channel information to perform a precoding operation so that a high quality symbol may be transmitted. Since the symbol is transmitted according to instantaneous channel situations, an instantaneous channel facing problem may be efficiently solved, and an array gain may be obtained by using multiple antennas. An optimized combination transmitting method and an own-beam-forming method have been known as examples of the closed-loop system, and it has been widely known through various research that maximum diversity and array gains may be obtained in the multiple antenna system by using the above methods.

The closed-loop multiple antenna system has excellent performance as described above, but there are some problems involved in realizing it. Since channels of transmitting and receiving antennas are not identical in a conventional communication system, it is actually impossible to obtain instantaneous downlink information at the transmitting antenna. Therefore, channel information estimated by the receiving terminal is required to be transmitted back to the transmitter as feedback information so that the transmitting antenna may obtain the channel information. However, it is impossible to transmit the instantaneous channel information in a limited feedback channel band environment. Accordingly, a quantization precoding method for precoding the symbol at the transmitting terminal by using the channel information has been proposed.

A quantization precoder uniformly quantizes a space formed by the channels of the multiple antennas to form a codebook (hereinafter referred to as a "quantization codebook"), and transmits channel information to the transmitting terminal by using an index of the codebook since the codebook is shared by the transmitting and receiving terminals. When the size of the codebook is sufficiently great, the quantization precoding method may obtain performance close to the optimum combination of transmitting and own-beam-forming methods in which the exact information is informed to the transmitting terminal. When assuming that channel elements of the multiple antennas are iid complex Gaussian random variables, N (the size of the codebook) unitary matrixes representing a total random unitary matrix space is obtained by using characteristics of a right matrix of a channel matrix having uniform distribution on the random unitary matrix, and the N obtained unitary matrixes are used as the quantization codebook.

Figure 1:
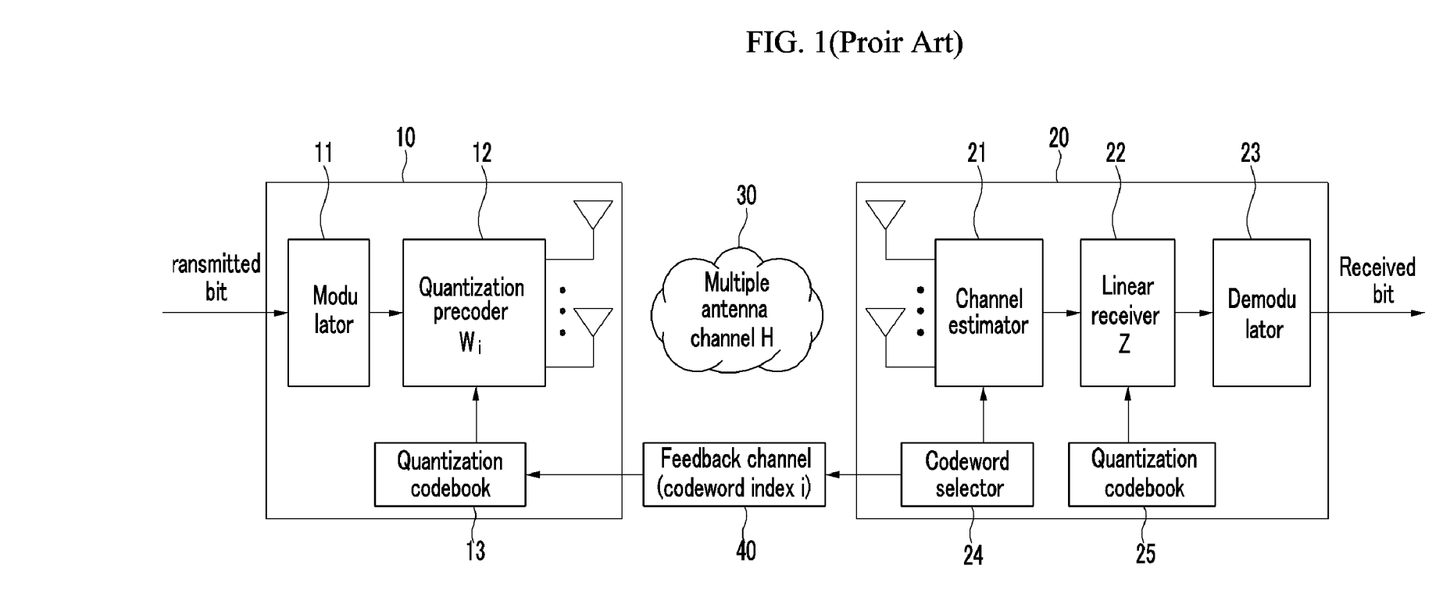
FIG. 1 shows a diagram representing a conventional multiple antenna system.

As shown in FIG. 1, in a transmitting terminal 20 of the multiple antenna system, a channel estimator 21 estimates a channel by using a training symbol transmitted from a transmitting terminal 10, and transmits information on the estimated channel to a codeword selector 24. The codeword selector 24 selects a codeword for minimizing a bit error rate of a current channel among codewords of the quantization codebook 25 based on the estimated channel information, and transmits an index of the selected codeword to the transmitting terminal 10 through a feedback channel.

In the transmitting terminal 10, a modulator 11 modulates an inputted data stream, and a quantization precoder 12 precodes the modulated data stream and transmits it to the receiving terminal 20 through a multiple antenna channel 30. When the index of the codeword transmitted by the receiving terminal 20 is i, the quantization precoder 12 precodes the modulated data stream by using $W_i$ as a precode matrix and transmits the precoded data stream to the receiving terminal 20. A signal vector y received at the receiving terminal 20 is given as Math Figure 1.

$$y = HW_i s + n \qquad \text{[Math Figure 1]}$$

Here, H denotes a channel matrix having an $M_R \times M_T$ dimension, in which respective elements of the matrix follow iid complex Gaussian distribution having an average of 0 and a variance of 1. $M_R$ and $M_T$ respectively denote the numbers of the receiving antennas and the transmitting antennas. $W_i$ denotes an $i^{th}$ codeword having an $M_T \times N_s$ dimension, in which all column vectors of the matrix have an orthonormal characteristic with each other. s denotes a symbol vector having an $N_s \times 1$ dimension, which satisfies $E\{ss^H\} = \epsilon_s/N_s$. n denotes a noise vector having an $M_R \times 1$ dimension, in which respective elements follow a complex Gaussian distribution having an average of 0 and a variance of $N_0$.

In addition, when the receiving terminal 20 uses a zero forcing (ZF) linear receiver, an effective signal to noise ratio (SNR) of a $k^{th}$ stream may be given as Math Figure 2.

$$\eta_k = \frac{\rho}{M_T} \frac{1}{[\{(HW_i)^H \cdot (HW_i)\}^{-1}]_{k,k}}, \, k = 1, \ldots, N_s \qquad \text{[Math Figure 2]}$$

Here, $\rho = \epsilon_s/N_0$ denotes an SNR of the multiple antenna system, and $[\cdot]_{k,k}$ denotes a $(k,k)^{th}$ element of a matrix. Since $\rho$ and $M_T$ among the induced effective data stream are used in common for all the data streams, a metric for selecting the codeword is given as Math Figure 3 after eliminating the common values $\rho$ and $M_T$, which will be referred to as an SNR metric.

$$\tilde{\eta}_k = \frac{1}{[\{(HW_i)^H (HW_i)\}^{-1}]_{k,k}} \qquad \text{[Math Figure 3]}$$

When the SNR metric for each data stream is induced, a codeword minimizing a bit error rate is selected as shown in Math Figure 4.

$$i^* = \underset{i}{\operatorname{argmax}} \left\{ \underset{k=1,\ldots,N_s}{\min} \tilde{\eta}_k \right\} \qquad \text{[Math Figure 4]}$$

A codeword index $i^*$ selected by using Math Figure 4 is transmitted to the transmitting terminal 10 through a feedback channel 40, and the quantization precoder 12 of the transmitting terminal 10 precodes the data stream modulated by the modulator 11 by using $W_{i*}$ as the precode matrix and transmits the precoded data stream through the transmitting antenna. As described, the linear receiver 22 of the receiving terminal 20 uses Math Figure 5 to detect a symbol from among the data stream transmitted after being precoded by $W_{i*}$ at the transmitting terminal 10 detects a symbol.

$$\hat{s} = Zy = (HW_{i*})^{\dagger} y \qquad \text{[Math Figure 5]}$$

Here, $(\cdot)^{\dagger}$ denotes a pseudo inverse operation of a matrix.

However, the quantization precoder 12 has limitations regarding instantaneous or statistical channel variations since the data stream is fixed in the quantization precoder 12. That is, the quantization codebook used in the quantization precoder 12 is designed while assuming independent coefficients of multiple spatial channels. Therefore, performance is steeply reduced when a channel spatial correlation exists and the number of channel ranks is less than the number of initially determined streams due to the channel spatial correlation. Since such a channel rank deficiency may be instantaneously caused in a spatially independent channel, the performance is considerably deteriorated in the quantization precoder 12 having the fixed number of the data streams.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a transmitting apparatus for adaptively operating in instantaneous or statistical channel variations in a multiple antenna system to prevent performance deterioration of a quantization precoder, a method thereof, a receiving apparatus, and a method thereof.

Technical Solution

An exemplary transmitting apparatus for transmitting a data stream in a multiple antenna system according to an embodiment of the present invention includes a plurality of quantization codebooks, a modulator, and a quantization precoder. The plurality of quantization codebooks correspond to the number of the data streams and are formed by quantizing channel information between a transmitting antenna and a receiving antenna. The modulator modulates at least one selected data stream based on an index of a stream mode in feedback information transmitted from a receiving apparatus (here, the stream mode is defined to determine a modulation method applied to each data stream). The quantization precoder precodes the modulated data stream based on a codeword index in the feedback information transmitted from the receiving apparatus among the quantization codebook corresponding to the stream mode of the index, and transmits the precoded data stream to the receiving apparatus.

An exemplary receiving apparatus for receiving a data stream in a multiple antenna system according to an embodiment of the present invention includes a plurality of quantization codebooks, a channel estimator, a stream mode selector, a codeword selector, and a demodulator. The plurality of quantization codebooks respectively correspond to the number of data streams, and are formed by quantizing channel information between a transmitting antenna and a receiving antenna. The channel estimator estimates a channel between the transmitting antenna and the receiving antenna. The stream mode selector performs a feedback operation such that an index of a stream mode (here, the stream mode is defined to determine a modulation method applied for each data stream) selected among a plurality of stream modes based on a data rate of data stream and a channel state estimated by the channel estimator may be transmitted to a transmitting apparatus. The codeword selector performs the feedback operation so that an index of codeword selected from the quantization codebook of the data stream corresponding to the index of the stream mode may be transmitted to the transmitting apparatus. The demodulator demodulates the data stream based on the stream mode selected by the stream mode selector and the channel information estimated by the channel estimator.

In a transmitting method for transmitting a data stream in a multiple antenna system according to an embodiment of the present invention, a) an index of a stream mode (here, the stream mode is defined to determine a modulation method applied to each data stream) selected based on channel state information between a transmitting antenna and a receiving antenna, and an index of a codeword are received, b) the number of the transmitted data stream and the modulation method applied to the transmitted data stream based on the stream mode of the received index are selected, and the data stream is modulated, and c) the modulated data stream is precoded by using the codeword of the received index, and the precoded data stream is transmitted to a receiving apparatus.

In an exemplary receiving method for receiving a data stream in a multiple antenna system according to another embodiment of the present invention, a) respective codewords of a plurality of quantization codebooks corresponding to the number of data streams are selected based on channel information estimated by using a received training symbol, b) a stream mode is selected from among a plurality of stream modes (here, the stream mode is defined to determine a modulation method applied to each data stream), and c) the data stream is detected by using the codeword corresponding to the quantization codebook of the data stream corresponding to the selected stream mode as a precode matrix, and the detected data stream is modulated.

Advantageous Effects

In the exemplary embodiment of the present invention, since the number of data streams is adaptively selected according to the instantaneous channel variation, the rank deficiency may be prevented. Accordingly, the bit error rate of the quantization precoder may be greatly improved.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. When it is described that an element is coupled to another element, the element may be directly coupled to the other element or coupled to the other element through a third element.

A transmitting apparatus and a method thereof, and a receiving apparatus and a method thereof in a multiple antenna system according to an exemplary embodiment of the present invention will now be described with reference to the figures.

Figure 2:
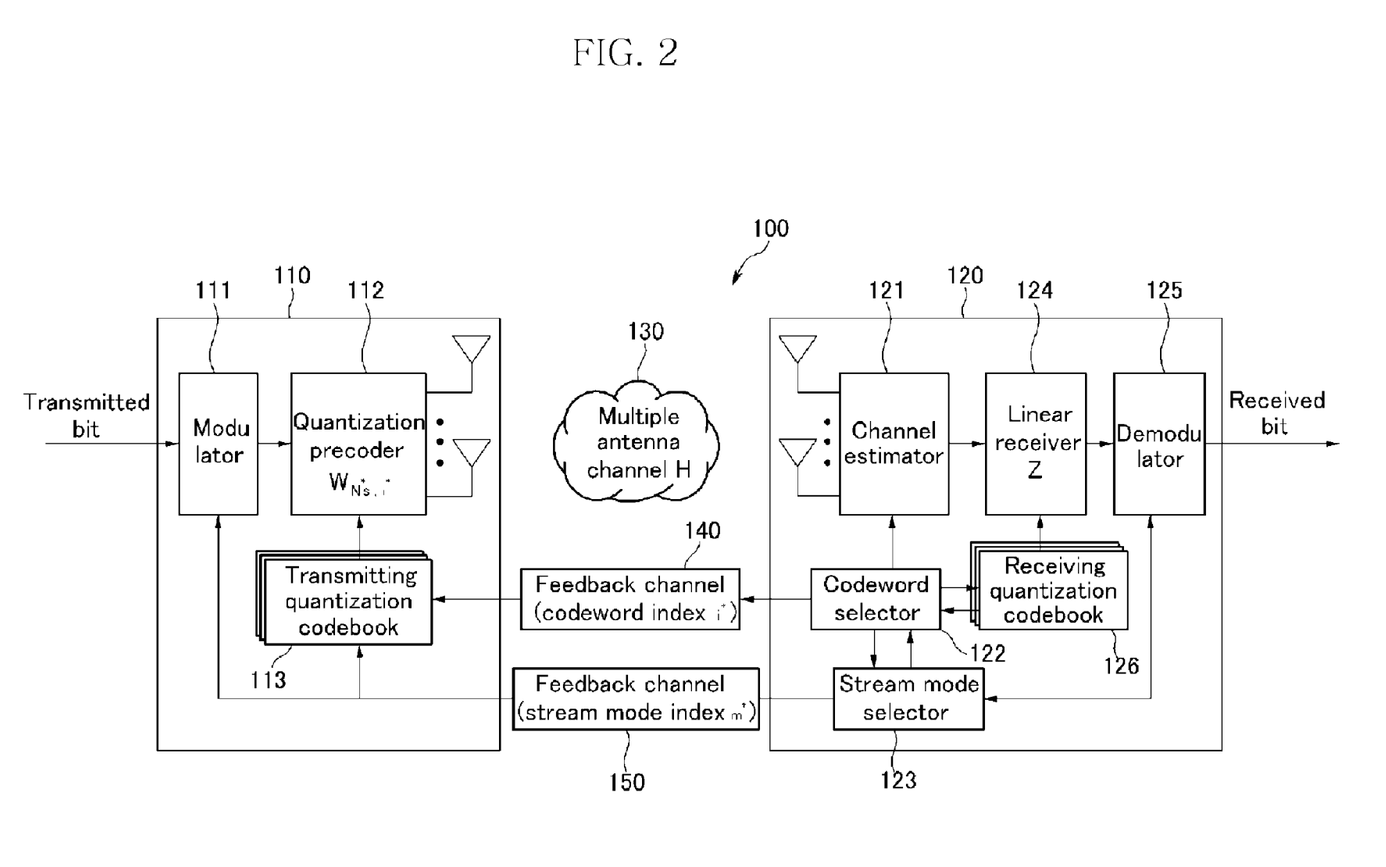
FIG. 2 shows a diagram representing a multiple antenna system according to an exemplary embodiment of the present invention.

FIG. 2 shows a diagram representing a multiple antenna system according to an exemplary embodiment of the present invention.

As shown in FIG. 2, the multiple antenna system 100 includes a transmitting apparatus 110 and a receiving apparatus 120. The transmitting apparatus 100 modulates data and transmits the modulated data to the receiving apparatus 200, and the receiving apparatus 200 demodulates and detects the modulated data transmitted from the transmitting apparatus 100.

The receiving apparatus 120 includes a channel estimator 121, a codeword selector 122, a stream mode selector 123, a linear receiver 124, a demodulator 125, and a receiving quantization codebook 126.

The channel estimator 121 estimates a channel H between multiple antennas by using an initially transmitted training symbol, and transmits the channel to the codeword selector 122.

The codeword selector 122 selects a codeword that is appropriate for a current channel situation, based on information on the estimated channel. The receiving quantization codebook 126 is used when the codeword selector 122 selects the appropriate codeword. It is the quantized channel information between the multiple antennas, and it includes a plurality of quantization codebooks corresponding to the number of data streams.

The codeword selector 122 selects an individually optimized codeword from among each quantization codebook of the receiving quantization codebook 126, and transmits maximum signal to noise ratio (SNR) metrics (the maximum SNR metrics induced when an optimized codeword is selected from among the respective quantization codebooks of the receiving quantization codebook 126) to the stream mode selector 123. In addition, the codeword selector 122 performs a feedback operation such that an index i* of the optimized codeword of the quantization codebooks corresponding to an index m* of a stream mode selected by the stream mode selector 123 is transmitted to a transmitting quantization codebook 113 through a feedback channel 140.

The stream mode selector 123 selects the index m* of the stream mode having the greatest SNR metric by comparing the maximum SNR metrics transmitted from the codeword selector 122, and transmits the selected index m* of the stream mode to the codeword selector 122, the demodulator 125, the transmitting quantization codebook 113, and a modulator 111.

The linear receiver 124 detects the data steam transmitted from the transmitting apparatus 110 by using the channel information estimated by the channel estimator 121 and a precode matrix transmitted from the receiving quantization codebook 126, and transmits the detected data stream to the demodulator 125.

The demodulator 125 refers to the index m* of the stream mode transmitted from the stream mode selector 123 and a modulation method for each data stream in the transmitting apparatus 110 so as to demodulate the data stream transmitted from the linear receiver 124.

Subsequently, the transmitting apparatus 110 will be described. The transmitting apparatus 110 includes the modulator 111, a quantization precoder 112, and the transmitting quantization codebook 113.

The modulator 111 selects the number of data streams according to the index m* of the stream mode transmitted from the receiving apparatus 120 through the feedback channel 150, selects a modulation method corresponding to the respective selected data streams, and modulates the respective data streams.

The quantization precoder 122 precodes the data stream modulated by the modulator 111 by using a codeword of the index i* in the quantization codebook corresponding to the index m* of the stream mode transmitted from the receiving apparatus 120 as a precode matrix $W_{N_s^*, i^*}$, and transmits the precoded data stream through the transmitting antenna.

The transmitting quantization codebook 113 corresponds to the receiving quantization codebook 126, and includes a plurality of quantization codebooks corresponding to the number of data streams.

The modulation method of the modulator 111 will now be described in further detail. In the modulation method, a service of up to three substreams may be provided when assuming that the multiple antenna system uses four transmitting antennas and three receiving antennas.

For example, to obtain a data rate of 6 bps/Hz, when the modulation methods include quadrature phase shift keying (QPSK), 16 quadrature amplitude modulation (QAM), and 64 QAM modulation methods, the 64 QAM modulation method may be used when a service provides a single substream, and the 16QAM and QPSK modulation methods or the QPSK and 16QAM modulation methods may be respectively used for two substreams when the service provides the two substreams.

In addition, the QPSK, the QPSK, and the QPSK modulation methods may be used for three data streams when the service provides the three substreams.

When the data rate is 6 bps/Hz, the service providing the single substream will be referred to as a stream mode 1, the service providing the two substreams will be respectively referred to as a stream mode 2 and a stream mode 3 since two cases occur according to the modulation method, and the service providing the three substreams will be referred to as a stream mode 4.

Accordingly, Table 1 may be generated for the respective data rates of the data streams. Data rates of 6 bps/Hz and 8 bps/Hz are shown in Table 1.

TABLE 1

| Data rate (bps/Hz) | Number of streams ($N_s$) | Stream mode (m*) | Modulation method for each stream |
|---|---|---|---|
| 6 | 1 | 1 | 64QAM |
|  | 2 | 2 | 16QAM, QPSK |
|  |  | 3 | QPSK, 16QAM |
|  | 3 | 4 | QPSK, QPSK, QPSK |
| 8 | 2 | 1 | 16QAM, 16QAM |
|  |  | 2 | 64QAM, QPSK |
|  |  | 3 | QPSK, 64QAM |
|  | 3 | 4 | 16QAM, QPSK, QPSK |
|  |  | 5 | QPSK, 16QAM, QPSK |
|  |  | 6 | QPSK, QPSK, 16QAM |

Therefore, the modulator 111 refers to Table 1, modulates the data streams according to the number of data streams and the modulation methods that correspond to the index m* transmitted from the receiving apparatus 120 as the feedback information, and transmits the data streams to the quantization precoder 112.

That is, when the data rate of 6 bps/Hz is required and the index m* of the stream mode is transmitted from the receiving apparatus 120 as the feedback information is 3, the modulator 111 selects 2 as the number of transmitted data streams, and modulates the respective data streams in the QPSK and the 16QAM modulation methods.

In addition, $V(M_T, N_s, L)$ denotes a quantization codebook for each data stream. Here, L denotes the number of bits for expressing an index of the quantization codebook. When L is 3, the quantization codebook has $2^L$ codewords (i.e., 8 codewords). When a 3 bit codebook is used, the quantization codebooks of V(4,1,3), V(4,2,3), and V(4,3,3), and the stream mode 2 and the stream mode 3 share the quantization codebook of V(4,2,3).

Figure 3:
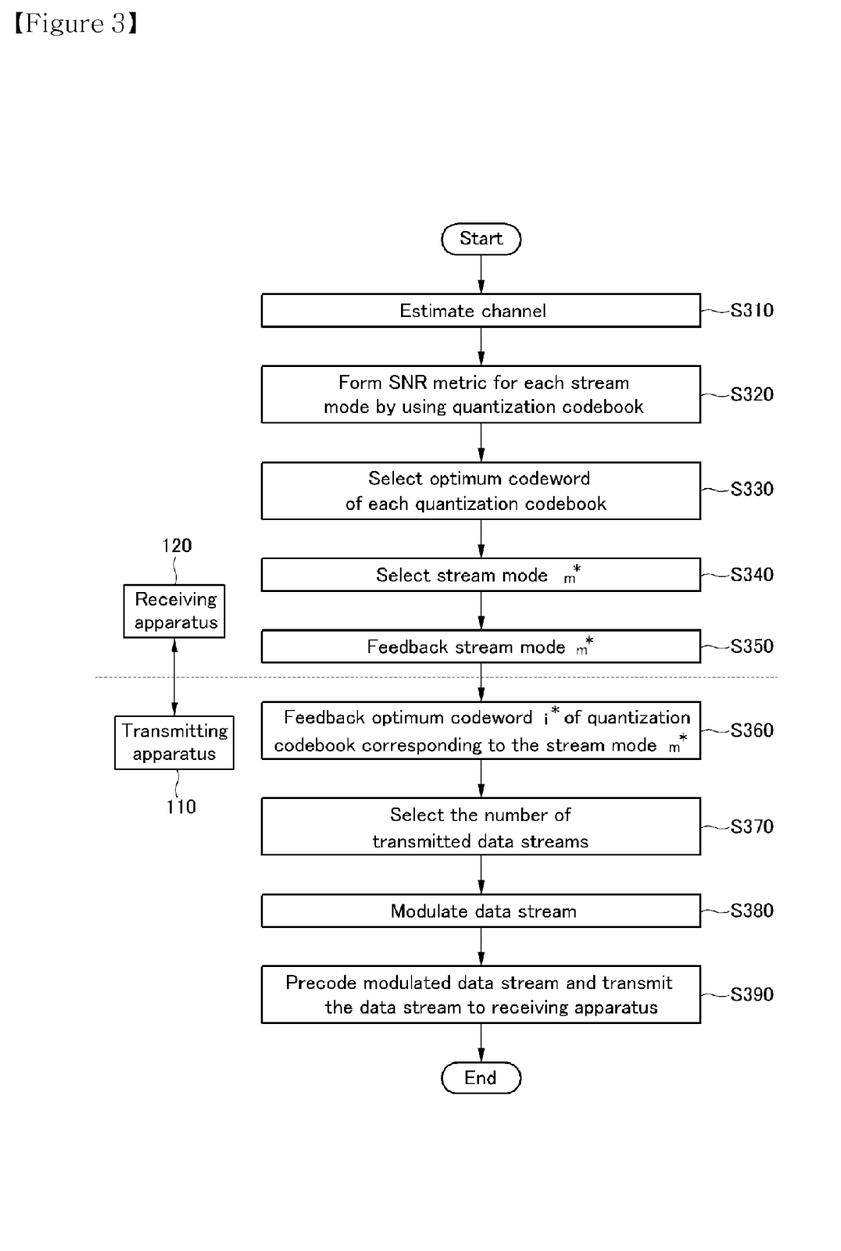
FIG. 3 shows a flowchart representing an operational process of the multiple antenna system according to the exemplary embodiment of the present invention.

FIG. 3 shows a flowchart representing an operational process of the multiple antenna system according to the exemplary embodiment of the present invention.

As shown in FIG. 3, the channel estimator 121 estimates a channel in step S310, and transmits information on the estimated channel to the codeword selector 122. The codeword selector 122 selects an optimum codeword for each quantization codebook of the receiving quantization codebook 126 based on the estimated channel information in step S330. In this case, the SNR metric for selecting the codeword is given as Math Figure 6.

$$\tilde{\eta}_{m,k} = \frac{1}{[\{(HW_{N_s,i})^H (HW_{N_s,i})\}^{-1}]_{k,k}} \times \frac{1.5}{(M_k - 1)},$$ [Math Figure 6]

$$W_{N_s, i} \in V(M_T, N_s, L)$$

Here, $\tilde{\eta}_{m,k}$ denotes an SNR metric of an $k^{th}$ ($1 \leq k \leq N_s$) data stream when the quantization codebook corresponding to an $m^{th}$ stream mode is used. $W_{N_s,i}$ denotes an $i^{th}$ ($1 \leq i \leq 2L$) codeword of the quantization codebook having $N_s$ data streams, and a relationship between $N_s$ and m is determined by a table of the stream mode and the number of data streams (e.g., Table 1). $M_k$ denotes a modulation order applied to a $k^{th}$ data stream, and 1.5/(Mk−1) denotes a scaling factor for calculating an effective SNR metric according to the modulation order.

The SNR metric for each stream mode is formed in step S320 as described above, and the codeword for each stream is selected in step S330 as Math Figure 7.

$$i^* = \operatorname*{argmax}_{i} \left\{ \min_{k=1,\ldots,N_s} \tilde{\eta}_{m,k} \right\}$$ [Math Figure 7]

In addition, the SNR metrics by the optimum codeword selected for the respective stream modes are given as Math Figure 8, and are transmitted to the stream mode selector 123.

$$\tilde{\eta}_{max,m} = \max_{i} \left\{ \min_{k=1,\ldots,N_s} \tilde{\eta}_{m,k} \right\}$$ [Math Figure 8]

The stream mode selector 123 compares the SNR metrics for the respective stream modes, and selects the stream mode m* having the greatest value among the SNR metrics by using Math Figure 9 in step S340. In addition, the stream mode selector 123 performs the feedback operation in step S350 such that the selected stream mode m* is transmitted to the modulator 111 and the transmitting quantization codebook 113 through the feedback channel 150.

$$m^* = \max_{m} \tilde{\eta}_{max,m}$$ [Math Figure 9]

After the stream mode m* is selected, the receiving quantization codebook 126 activates the quantization codebook $V(M_T, N_s^*, L)$ corresponding to the stream mode m*, and performs the feedback operation such that an optimum codeword i* of $V(M_T, N_s^*, L)$ is transmitted to the transmitting apparatus 110 through the feedback channel in step S360.

The modulator 111 receiving the stream mode m* from the stream mode selector 123 through the feedback channel 150 selects the number $N_s^*$ of data streams and the modulation methods for the respective data streams by referring to the table of the stream mode and the number of data streams (e.g., Table 1) in step S370, and modulates the respective data streams in the respective selected modulation methods and transmits the modulated data streams to the quantization precoder 112 in step S380.

In addition, the quantization precoder 112 precodes the modulated data stream by the modulator 111 by using the precode matrix, and transmits the precoded data stream to the receiving apparatus through the multiple antenna channel 130 in step S390. In this case, the quantization codebook $V(M_T, N_s^*, L)$ corresponding to the stream mode m* is activated in the transmitting quantization codebook 113 receiving the codeword i* and the stream mode m* through the feedback channels 140 and 150, and an $i^{*th}$ codeword $W_{N_s^*, i^*}$ is used as the precode matrix.

Effects achieved when the number of data streams is adaptively selected according to the instantaneous channel variations will now be described with reference to FIG. 4 to FIG. 6.

In general, a spatial channel correlation between the multiple transmitting and receiving antennas is determined by an angle of departure (AOD), a transmit angular spread (TxAS), and an angle of arrival (AOA) and a receive angular spread (RxAS) at the receiving antenna. While the AOD and the AOA are given, the spatial correlation is increased as angular spreads (AS) at the transmitting/receiving apparatuses are reduced. In FIG. 4, a channel model (channel model I) having a high spatial correlation is shown, in which a channel having the AOD of 45°, the TxAS of 5°, the AOA of 45°, and the RxAS of 50° is used. In FIG. 5, a channel model (channel model II) having an appropriate spatial correlation in which a channel having the AOD of 45°, the TxAS of 45°, the AOA of 45°, and the RxAS of 50° is used. In FIG. 6, a channel model (channel model III) having no spatial correlation is shown, in which all the elements of the channel matrix have the iid complex Gaussian distribution. In FIG. 4 to FIG. 6, it is assumed that four transmitting antennas and three receiving antennas are used so that a service of up to three data streams may be provided as shown in Table 1, and a data rate of 6 bps/Hz is assumed so that the four stream modes may be used at a fixed data rate.

Since the quantization codebook for each stream has 8 (3 bit) codewords, the quantization codebook for one data stream is V(4,1,3), the quantization codebook for two data streams is V(4,2,3), and the quantization codebook for three data streams is V(4,3,3).

Figure 4:
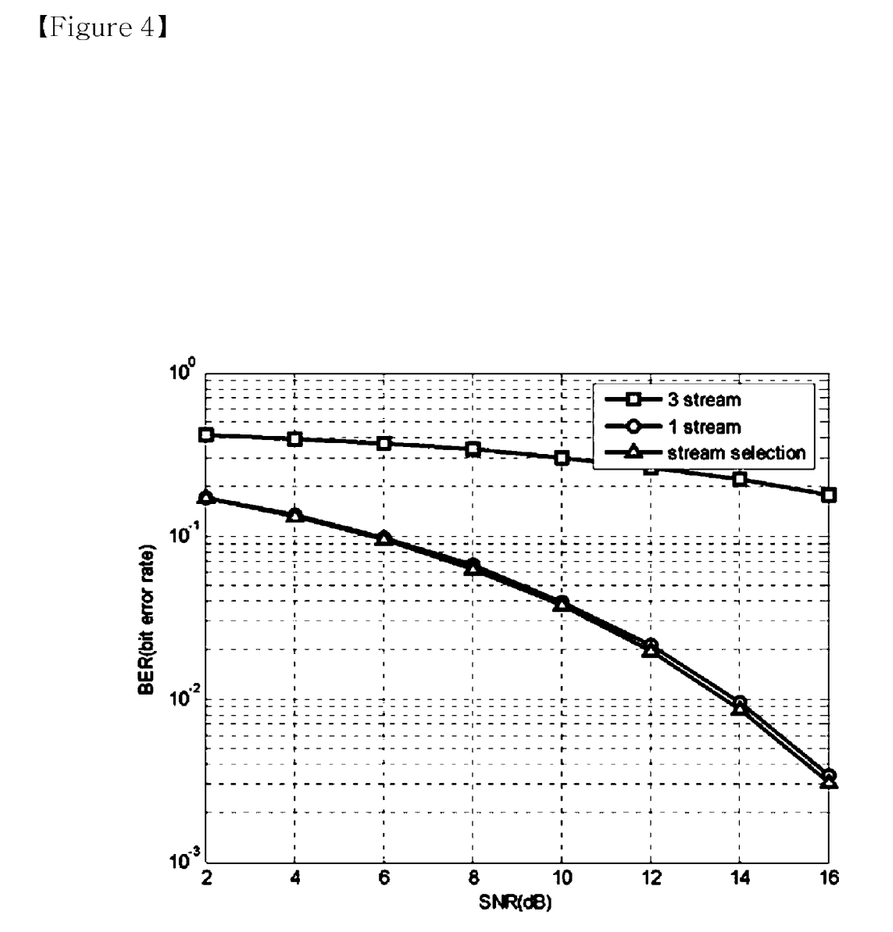
FIG. 4 to FIG. 6 show graphs for comparing bits error rates of a quantization precoder shown in FIG. 1 and a quantization precoder shown in FIG. 2 in a case of the channel model I.

FIG. 4 shows a graph for comparing bits error rates of the quantization precoder shown in FIG. 1 and the quantization precoder shown in FIG. 2 in a case of the channel model I.

As shown in FIG. 4, since an instantaneous rank of the channel is formed to be 1 due to the high spatial correlation in the channel model I, the bit error rate is greatly degraded in a case of the fixed 3 data stream. In addition, in a case of the 1 data stream, since a channel rank deficiency is not generated, high performance is achieved. When the number of streams is adaptively selected according to the instantaneous channel variations according to the exemplary embodiment of the present invention (i.e., stream selection in FIG. 4), the performance that is similar to the same as the 1 data stream is achieved since the stream mode 1 having the 1 data stream is selected due to the high spatial correlation of the channel. In this case, the performance is higher than with the fixed 1 data stream since the instantaneously increased channel rank is adaptively used.

Figure 5:
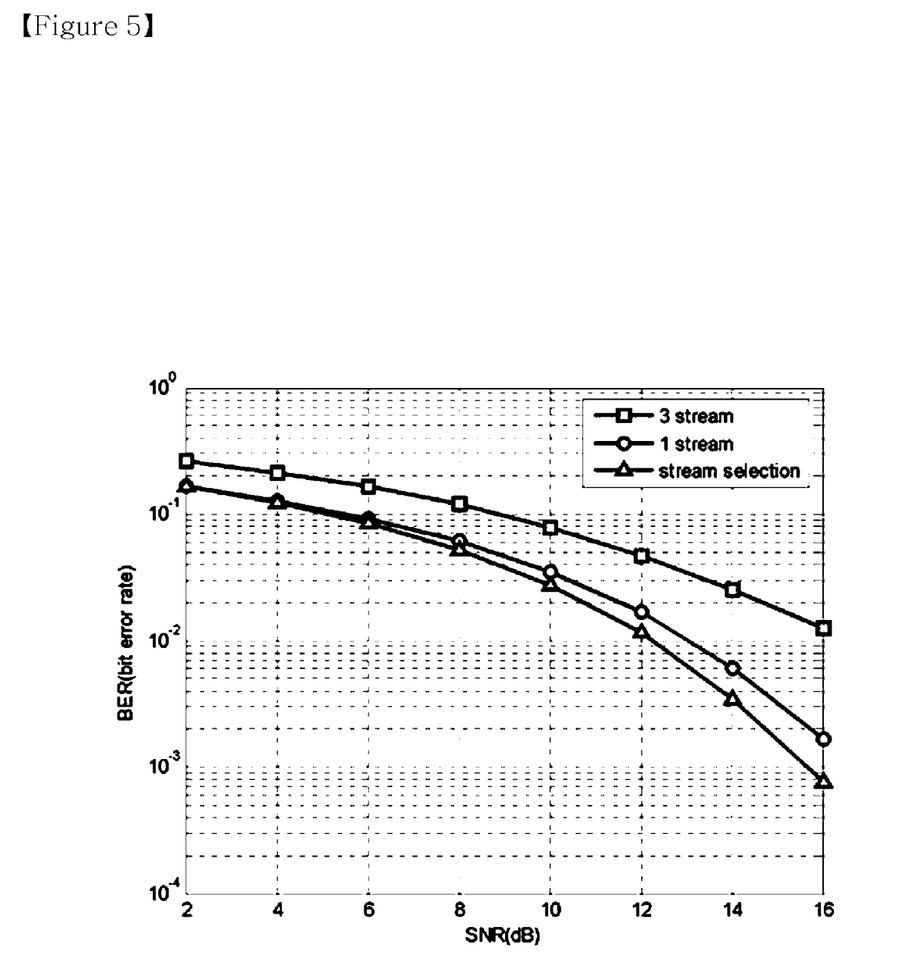

FIG. 5 shows a graph for comparing the bit error rates of the quantization precoder shown in FIG. 1 and the quantization precoder shown in FIG. 2 in a case of the channel model II.

As shown in FIG. 5, since the rank deficiency is reduced compared to the channel model I, in the channel model II having the appropriate spatial correlation as the spatial correlation of channel is reduced, the performance of the 3 data stream is improved. However, the performance of the 3 data stream is still lower than the 1 data stream that experiences no rank deficiency. When the number of streams is adaptively selected according to the instantaneous channel variation according to the exemplary embodiment of the present invention (the stream selection in FIG. 5), since a probability for selecting various stream modes is increased as the spatial correlation of the channel is reduced, a performance gain that is higher than the 1 data stream is achieved.

Figure 6:
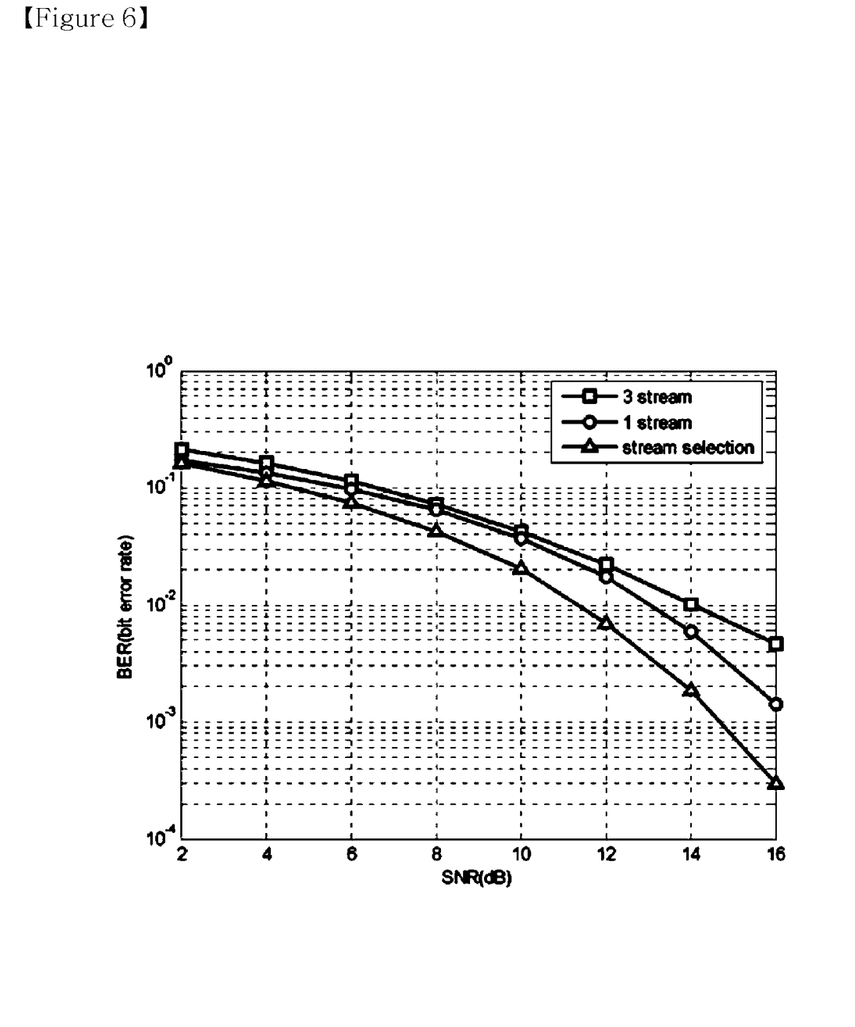

FIG. 6 shows a graph for comparing the bit error rates of the quantization precoder shown in FIG. 1 and the quantization precoder shown in FIG. 2 in a case of the channel model III.

As shown in FIG. 6, the instantaneous channel rank varies when there is no spatial correlation. Therefore, when the number of substreams is adaptively selected according to the instantaneous channel variation in the exemplary embodiment of the present invention (the stream selection in FIG. 6), the performance regarding the bit error rate is greater compared to the single substream and the three substreams.

That is, in the exemplary embodiment of the present invention, an SNR gain and a diversity gain that is higher than the fixed single substream and three substreams are obtained, and the SNR gain of 2 dB is obtained compared to the case of the single substream.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitting apparatus for transmitting a data stream in a multiple antenna system, the transmitting apparatus comprising:

a plurality of quantization codebooks corresponding to a number of data streams and formed by quantizing channel information between a transmitting antenna and a receiving antenna;

a modulator for determining the number of data streams to be transmitted based on an index of a selected stream mode in feedback information transmitted from a receiving apparatus wherein the stream mode is selected at the receiving apparatus and is defined to determine a modulation method applied to each data stream at the transmitting apparatus, and modulating at least one data stream corresponding to the number of data streams based on the index of the selected stream mode; and a quantization precoder for precoding the modulated data stream based on a codeword index in the feedback information transmitted from the receiving apparatus among the quantization codebook corresponding to the stream mode of the index, and transmitting the precoded data stream to the receiving apparatus.

2. The transmitting apparatus of claim 1, wherein the modulator determines a modulation method to be applied to the data stream, based on the stream mode of the index.

3. The transmitting apparatus of claim 2, wherein the modulation method is set by a data stream data rate and the number of data streams.

4. A receiving apparatus for receiving a data stream in a multiple antenna system, a plurality of quantization codebooks respectively corresponding to the number of data streams and formed by quantizing channel information between a transmitting antenna and a receiving antenna;

a channel estimator for estimating a channel between the transmitting antenna and the receiving antenna;

a stream mode selector for performing a feedback operation such that an index of a stream mode wherein the stream mode is defined to determine a modulation method applied for each data stream at a transmitting apparatus and is selected among a plurality of stream modes based on a data stream data rate and a channel state estimated by the channel estimator is transmitted to the transmitting apparatus;

a codeword selector for performing the feedback operation so that an index of a codeword selected from the quantization codebook of the data stream corresponding to the index of the stream mode is transmitted to the transmitting apparatus; and a demodulator for demodulating the data stream based on the stream mode selected by the stream mode selector and the channel information estimated by the channel estimator, wherein the number of data streams to be transmitted at the transmitting apparatus is determined based on the index of the stream mode.

5. The receiving apparatus of claim 4, wherein the codeword selector selects a codeword of each stream mode by a signal to noise (SNR) value of each data stream from the quantization codebook corresponding to each stream mode.

6. The receiving apparatus of claim 5, wherein the stream mode selector selects the stream mode having the greatest SNR value among SNR values of the respective data streams.

7. The receiving apparatus of claim 4, further comprising a linear receiver for detecting the data stream by using the codeword selected from the quantization codebook corresponding to the stream mode of the index and the channel information estimated by the channel estimator, and transmitting the detected data stream to the demodulator.

8. The receiving apparatus of claim 7, wherein the transmitting apparatus determines the number of data streams to be transmitted and the modulation method to be applied to the data streams, based on the index of the feedback stream mode and the index of the codeword.

9. A transmitting method for transmitting a data stream in a multiple antenna system, the transmitting method comprising:
   a) receiving an index of a stream mode wherein the stream mode is defined to determine a modulation method applied to each data stream) and is selected based on channel state information between a transmitting antenna and a receiving antenna, and an index of a codeword;
   b) determining the number of data streams to be transmitted and the modulation method to be applied to at least one data stream corresponding to the number of data streams determined based on the stream mode of the received index, and modulating the at least one data stream; and
   c) precoding the modulated data stream by using the codeword of the received index, and transmitting the precoded data stream to a receiving apparatus.

10. The transmitting method of claim 9, wherein the codeword of the received index is a codeword of a quantization codebook wherein the quantization codebook is formed by quantizing channel information between the transmitting antenna and the receiving antenna) corresponding to the stream mode of the received index among a plurality of quantization codebooks corresponding to the number of data streams.

11. A receiving method for receiving a data stream in a multiple antenna system, comprising:
   a) selecting respective codewords of a plurality of quantization codebooks corresponding to the number of data streams based on channel information estimated by using a received training symbol;
   b) selecting a stream mode from among a plurality of stream modes wherein the stream mode is defined to determine a modulation method applied to each data stream in a transmitting apparatus; and
   c) detecting the data stream by using the codeword corresponding to the quantization codebook of the data stream corresponding to the selected stream mode as a precode matrix, and demodulating the detected data stream, wherein the number of data streams to be transmitted at the transmitting apparatus is determined based on the index of the stream mode.

12. The receiving method of claim 11, further comprising performing a feedback operation so that an index of the stream mode selected in b) and an index of the codeword used as the precode matrix in c) is transmitted to the transmitting apparatus.

13. The receiving method of claim 12, wherein, in b), the stream mode having the greatest signal to noise ratio (SNR) value among SNR values of the respective data streams is selected from the quantization codebook corresponding to each stream mode.

14. The receiving method of claim 11, wherein the number of data streams to be transmitted and the modulation method are selected based on the transmitted index of feedback streams by the feedback operation.

* * * * *